United States Patent
Seo

(10) Patent No.: US 9,346,333 B2
(45) Date of Patent: May 24, 2016

(54) BUMPER STOPPER INTEGRATED WITH DUST COVER

(71) Applicant: Hyundai Motor Company, Seoul (KR)

(72) Inventor: Jae Sik Seo, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/532,748

(22) Filed: Nov. 4, 2014

(65) Prior Publication Data

US 2015/0231941 A1    Aug. 20, 2015

(30) Foreign Application Priority Data

Feb. 17, 2014    (KR) ........................ 10-2014-0017713

(51) Int. Cl.
| | |
|---|---|
| *B60G 15/00* | (2006.01) |
| *B60G 15/06* | (2006.01) |
| *F16F 9/38* | (2006.01) |
| *F16F 9/58* | (2006.01) |

(52) U.S. Cl.
CPC . *B60G 15/06* (2013.01); *F16F 9/38* (2013.01); *F16F 9/58* (2013.01); *B60G 2202/143* (2013.01); *B60G 2204/45021* (2013.01); *B60G 2206/81012* (2013.01)

(58) Field of Classification Search
CPC .. B60G 11/22; B60G 15/06; B60G 2202/143; B60G 2202/32; B60G 2206/42; B60G 2206/73; B60G 2206/81012
USPC ................. 267/220, 292, 153, 139, 140, 195
See application file for complete search history.

(56) References Cited

U.S. PATENT DOCUMENTS

| | | | | |
|---|---|---|---|---|
| 5,788,262 | A  * | 8/1998 | Dazy .................... | B60G 15/063 188/321.11 |
| 8,678,361 | B2 * | 3/2014 | Kim ..................... | B60G 15/068 188/380 |
| 2001/0015537 | A1* | 8/2001 | De Fontenay ........ | B60G 15/068 280/124.155 |
| 2002/0128371 | A1* | 9/2002 | Poppe ................. | B29C 45/0046 524/494 |
| 2008/0272529 | A1 | 11/2008 | Chervin et al. | |
| 2011/0156327 | A1 | 6/2011 | Nobusue et al. | |
| 2012/0193850 | A1* | 8/2012 | Szekely ................ | F16F 1/3732 267/292 |
| 2012/0193851 | A1* | 8/2012 | Szekely ................ | F16F 1/3732 267/292 |
| 2013/0161888 | A1* | 6/2013 | Szekely ................ | B60G 15/06 267/220 |
| 2013/0320590 | A1* | 12/2013 | Szekely ................ | B29C 67/00 264/294 |

FOREIGN PATENT DOCUMENTS

| | | |
|---|---|---|
| JP | 8-177941 A | 7/1996 |
| JP | 5272950 B2 | 8/2013 |
| KR | 10-2002-0084912 A | 11/2002 |
| KR | 10-2006-0133188 A | 12/2006 |
| KR | 10-2013-0093621 A | 8/2013 |
| KR | 10-2013-0124186 A | 11/2013 |
| WO | WO 2012/021619 A1 | 2/2012 |

* cited by examiner

*Primary Examiner* — Thomas J Williams
*Assistant Examiner* — Mariano Sy
(74) *Attorney, Agent, or Firm* — Morgan, Lewis & Bockius LLP

(57) ABSTRACT

An integrated bumper stopper may include a dust cover and a bumper stopper constituting a shock absorber of a vehicle. The bumper stopper may be formed on an upper portion of the dust cover and continuously extend from the upper portion of the dust cover. The dust cover and the bumper stopper may be integrally molded by using a material comprising a thermoplastic ether ester (TPEE) elastomer.

7 Claims, 6 Drawing Sheets

BUMPER STOPPER INTEGRATED
WITH DUST COVER

BUMPER
STOPPER

DUST COVER

BUMPER STOPPER INTEGRATED
WITH DUST COVER

NOISE OCCURS DURING OPERATION WHILE NOT BEING FIXED ON UPPER PORTION

EXAMPLE 1
(PBT-PTMEG COPOLYMER)

COMPARATIVE EXAMPLE 4
(POLYURETHANE)

COMPARATIVE EXAMPLE 4
(POLYURETHANE)

BUMPER STOPPER INTEGRATED WITH DUST COVER

CROSS-REFERENCE TO RELATED APPLICATION

The present application claims priority of Korean Patent Application No. 10-2014-0017713 filed on Feb. 17, 2014, the entire contents of which application are incorporated herein for all purposes by this reference.

BACKGROUND OF INVENTION

1. Field of Invention

The present invention relates to a bumper stopper integrated with a dust cover. More particularly, it relates to a bumper stopper integrated with a dust cover in which a bumper stopper constituting a shock absorber by using a material comprising thermoplastic ether ester (TPEE) elastomer, and a dust cover which covers the bumper stopper are integrally molded.

2. Description of Related Art

A shock absorber is an anti-vibration and shock absorbing device which is installed between an axle and a body of a vehicle and absorbs vibration or shock on the axle transmitted from the road surface to enhance passenger's ride comfort when the vehicle is driven. As illustrated in FIG. 1, a typical shock absorber includes a piston rod, a bumper stopper fixed and mounted on the upper portion of the piston rod, a dust cover which covers the piston rod and the bumper stopper, a damper part through which the piston rod is installed, and a cup which covers an upper portion of the damper part.

The bumper stopper serves to absorb shock and vibration inputted through the shock absorber when rebound occurs to the vehicle. For this purpose, in the bumper stopper, the energy absorption ratio needs to be extremely high, and long-term fatigue durability performance due to compressive deformation needs to be secured. Further, the bumper stopper needs to have a small rate of change in characteristics before and after the durability, and not incur a strange sound/noise during the operation.

Typically, urethane foam is applied as a material for a bumper stopper. The urethane foam has excellent energy absorption capability and excellent compressive deformation characteristic and durability, and thus is applied to most of the vehicle. However, the urethane foam is disadvantageous in being limited in grade which is applicable as a material for a bumper stopper and very expensive. Further, since hydrolysis due to moisture, generation of noise caused by freezing when moisture flows in during the cold spell, and an abrasion phenomenon caused by foreign materials such as sand occur in the urethane foam, it may be essential to install a dust cover in order to prevent the phenomenon. In addition, noise is likely to occur due to permeation of air between the cell structures and blow to a cup on the upper portion during compression and strain.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art and/or other problems.

In various aspects, the present invention provides a bumper stopper integrated with a dust cover (referred as an integrated bumper stopper) in which a dust cover which covers the bumper stopper is integrally molded.

In various aspects, the integrated bumper stopper includes a dust cover and a bumper stopper constituting a shock absorber of a vehicle, in which the bumper stopper is formed on an upper portion of the dust cover and continuously extends from the upper portion of the dust cover, and the dust cover and the bumper stopper are integrally molded by using a material comprising a thermoplastic ether ester (TPEE) elastomer.

The integrated bumper stopper of the present invention is manufactured as an integral form of a dust cover and a bumper stopper, and thus has an effect of simplifying the process.

An effect of reducing costs may be obtained by using a thermoplastic ether ester (TPEE) elastomer instead of an expensive polyurethane foam when the integrated bumper stopper of the present invention is manufactured by injection blow molding using the thermoplastic ether ester elastomer.

When an integrated bumper stopper is manufactured by using a block copolymer of polybutylene terephthalate and poly(tetramethylene ether glycol) as the thermoplastic ether ester (TPEE) elastomer, it is possible to obtain an effect that durability, weatherability and heat resistance are particularly enhanced compared to polyurethane foam materials.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
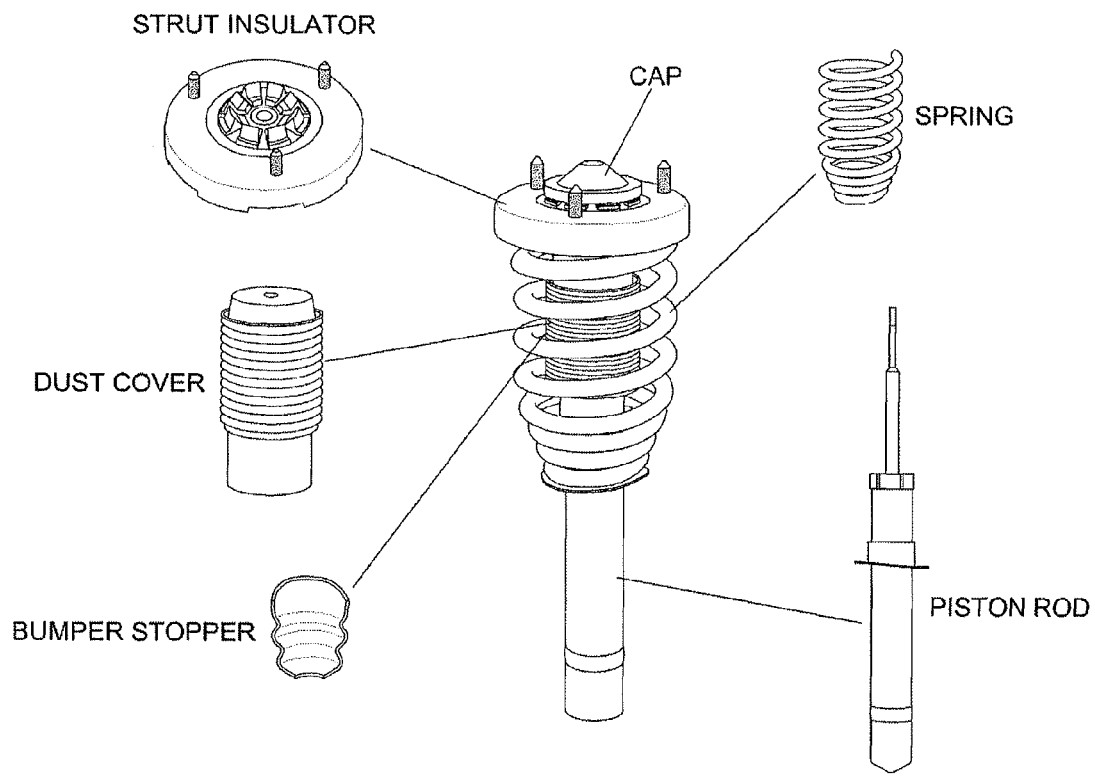
FIG. 1 illustrates a shock absorber in the related art.
Figure 2A:
FIG. 2A is a cross-sectional diagram illustrating a dust cover portion.
Figure 2B:
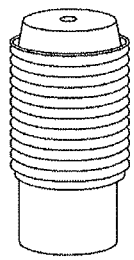
FIG. 2B is a cross-sectional diagram illustrating a bumper stopper.
Figure 2C:
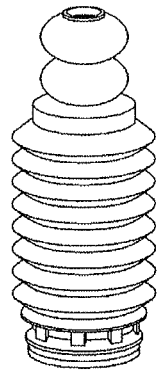
FIG. 2C is a cross-sectional diagram illustrating a bumper stopper integrated with dust cover.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A bumper stopper in the related art has a separation-type structure in which a fixing cup on the upper end, a bumper stopper and a dust cover are each separated, and each of the individual products is manufactured and assembled in a line. Thus, in the bumper stopper in the related art, when a large load is inputted from a road surface, such as the passage of a barrier, the bumper stopper directly hits an upper cup, causing noise until a shock absorber is compressed to absorb the shock. In addition, since the bumper stopper in the related art is formed of a urethane foam material, noise is caused by inflow of air during any abrupt movements.

On the contrary, a bumper stopper of the present invention is a bumper stopper integrated with a dust cover, and as illustrated in FIG. 2A, FIG. 2B and FIG. 2C and FIG. 3A, FIG. 3B and FIG. 3C, a fixing cup on the upper end, a bumper stopper and a dust cover may be integrally molded and manufactured, thereby solving the problems in the separation type bumper stopper in the related art. Herein, the terms of "bumper stopper integrated with a dust cover", "bumper stopper integrated with dust cover", and "integrated bumper stopper" are interchangeable.

The bumper stopper integrated with a dust cover of the present invention is configured to be in a form of a hollow corrugated pipe in which peaks and troughs are repeated in a longitudinal direction. Furthermore, the bumper stopper is of a bellow type having a curvature ratio of peak/trough at 1.8 to 2.2. In this case, when the curvature ratio of peak/trough is less than 1.8, there is a problem in molding the parts, and when the ratio is more than 2.2, stress is concentrated around the peak, so that there is a problem in that the durability performance sharply deteriorates.

Figure 3A:
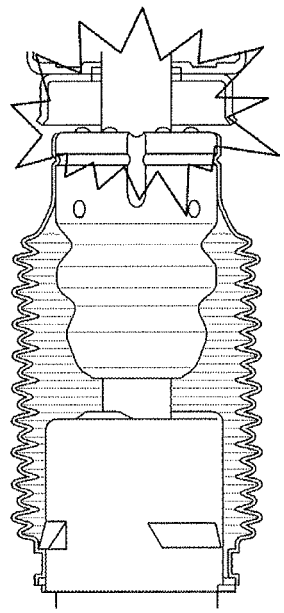
FIG. 3A is a cross-sectional diagram illustrating a bumper stopper integrated with dust cover without an upper fixed cup.
Figure 3B:
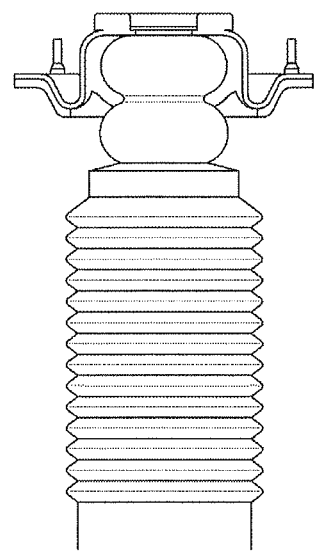
FIG. 3B is a cross-sectional diagram illustrating a bumper stopper integrated with dust cover equipped with an upper fixed cup.
Figure 3C:
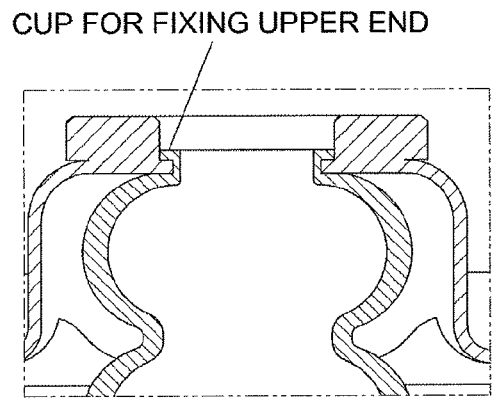
FIG. 3C is a cross-sectional diagram of the upper fixed cup portion magnified.

The bumper stopper integrated with a dust cover of the present invention has a fixing cup on the upper end to be fixed and mounted on the upper portion of a piston rod, as illustrated in FIG. 3B. Accordingly, even when a large load is inputted from the road surface and the shock absorber is compressed for absorbing shock, there is no concern in that the bumper stopper collides with the cup on the upper end. That is, the bumper stopper integrated with a dust cover of the present invention has a fixing cup on the upper end, and thus has an effect of eliminating a cause for making noise.

It is important to select a material for the bumper stopper integrated with a dust cover of the present invention to satisfy a functional performance. In order to be applied as a material for a bumper stopper integrated with a dust cover, elastic characteristics are particularly important, and since durability performance with respect to repeated fatigue significantly deteriorates in a general crystalline or amorphous polymer material, a function as a material for a bumper stopper integrated with a dust cover may not be achieved even though the mold according to the viscosity may be performed.

Thus, in the present invention, a thermoplastic ether ester elastomer is used as a material for a bumper stopper integrated with a dust cover. The TPEE material is advantageous because the material is elastic, and has high price competitiveness, excellent durability, weatherability, and heat resistance compared to a polyurethane foam used as a material for the bumper stopper in the related art.

As a material for a bumper stopper integrated with a dust cover according to the present invention, in some embodiments, a PBT-PTMEG block copolymer composed of a polybutylene terephthalate (PBT) unit structure as a hard segment and a poly(tetramethylene ether glycol) (PTMEG) unit structure as a soft segment is particularly preferably used as shown in the following Formula 1.

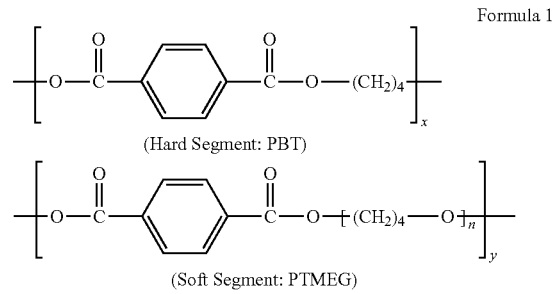

Formula 1

(Hard Segment: PBT)

(Soft Segment: PTMEG)

In Formula 1, x and y represent a weight ratio of the hard segment and the soft segment in which, in some embodiments, x is 50 to 60 wt % and y is 40 to 50 wt %; and n is a real number such that the molecular weight of PTMEG constituting the soft segment is 1,000 to 2,000 g/mol.

The PBT-PTMEG block copolymer shown in Formula 1 is composed of a hard segment of a PBT structure which reinforces general mechanical properties while forming a polyester bond and a soft segment of a PTMEG structure which imparts flexibility while forming a polyether bond.

In order to use the PBT-PTMEG block copolymer as a material for the bumper stopper integrated with a dust cover, the PBT-PTMEG block copolymer may be composed of 50 to 60 wt % of the PBT unit structure and 40 to 50 wt % of the PTMEG unit structure. In this case, when the content of the PTMEG unit structure as a soft segment constituting the PBT-PTMEG block copolymer is less than 40 wt %, it is difficult to satisfy performance as a bumper stopper due to insufficient flexural fatigue properties, and on the contrary, when the content is more than 50 wt %, there is a problem in that it is difficult to satisfy spring characteristics.

The PBT-PTMEG block copolymer may be prepared by a typical polymerization method, and may be prepared, for example, by copolymerizing dimethyl terephthalate (DMT), butanediol (BD) and poly(tetramethylene ether glycol) (PTMEG). In the present invention, there is no particular limitation on the method of polymerizing the PBT-PTMEG block copolymer. However, the molecular weight of the PTMEG unit structure constituting the PBT-PTMEG block copolymer may be in a range from 1,000 to 2,000 g/mol, and when the molecular weight of PTMEG is less than 1,000 g/mol, it is difficult to achieve performance required for the parts in terms of durability and noise, and when the molecular weight of PTMEG is more than 2,000 g/mol, there is a problem in mass production because it is difficult to commercially prepare the block copolymer.

Figure 4:
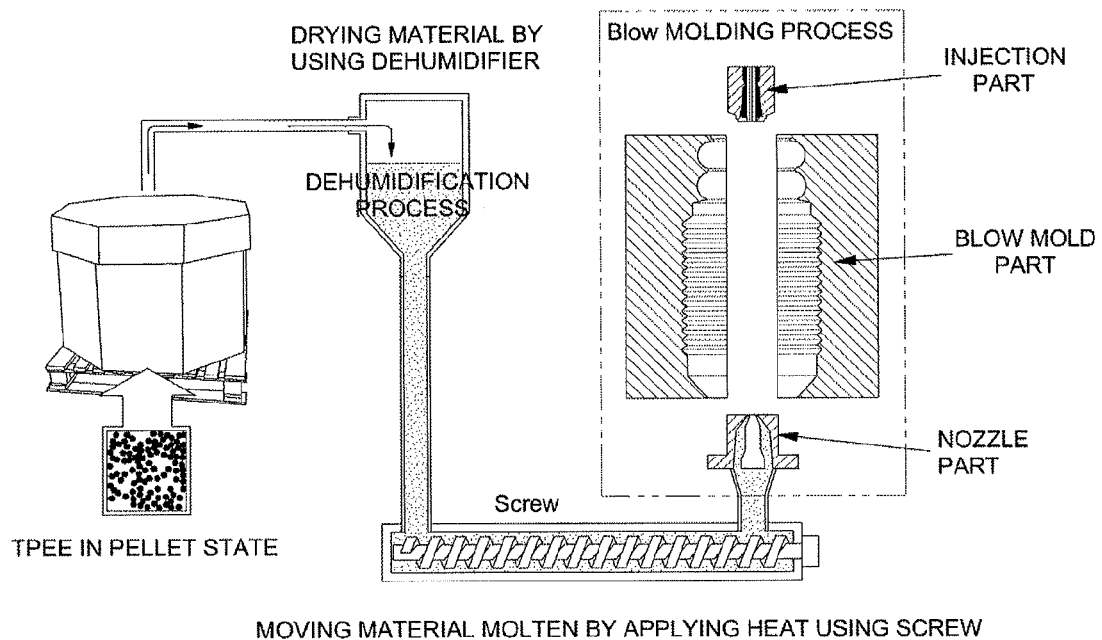
FIG. 4 is a schematic view illustrating an injection blow molding apparatus.

The bumper stopper integrated with a dust cover according to the present invention may be manufactured by using the injection blow molding apparatus illustrated in FIG. 4.

The injection blow molding apparatus is composed of an injection part, a blow mold part and a nozzle part. Specifically, when the molten TPEE material is discharged from the nozzle, the injection part in the upper portion may be lowered to press-mold a portion of the part, and then the molten TPEE material may be lifted to be blow-molded, thereby preparing the bumper stopper integrated with a dust cover.

In this case, when the thickness of the molded product is adjusted by the vertical movement of the nozzle, air is blown in the air holes of the injection part to closely adhere the resin to the mold, thereby manufacturing the part. For this purpose, in some embodiments, it is preferred that the melt viscosity of the TPEE material is maintained in a range from 5 to 20 g/10 min, and more preferred that the melt viscosity of the TPEE material is maintained in a range from 8 to 17 g/10 min. There is a problem in that when the melt viscosity of the TPEE material is less than 5 g/10 min, it is difficult to discharge the TPEE material from the nozzle and molding by blowing may not be achieved, and when the melt viscosity is more than 20 g/10 min, it is not easy to control the curvature ratio of the peak and trough structure and the thickness of the part required.

The present invention as described above will be described in more detail with reference to the following Examples, but the present invention is not limited thereto. The following examples illustrate the invention and are not intended to limit the same.

Examples 1 to 3 and Comparative Examples 1 to 4

A bumper stopper integrated with a dust cover was manufactured using an injection blow molding apparatus illustrated in FIG. 4.

First, each material shown in the following Table 1 was heated and molten. When the molten material was injected into a nozzle part and discharged therefrom, an injection part on the upper portion was lowered to press-mold a cup fixing an upper portion of the bumper stopper.

The injection part was raised in a state where the fixing cup on the upper portion was molded and the molten material was discharged from the nozzle part, and in this case, the thickness of the molded product was adjusted while the nozzle part was moving vertically.

A blow molding part was hermetically sealed, and then blow molding was performed by injecting air from the injection part. The molded part was taken out and cut, thereby producing the bumper stopper integrated with a dust cover.

TABLE 1

| | | Example | | | Comparative Example | | | |
|---|---|---|---|---|---|---|---|---|
| Classification | | 1 | 2 | 3 | 1 | 2 | 3 | 4 |
| Material | 1) PBT/PTMEG content (wt %) | 50/50 | 40/60 | 50/50 | 60/40 | 70/30 | 50/50 | — |
| | 2) Polyol/Isocyanate content (wt %) | — | — | — | — | — | — | 40/60 |
| Melt Viscosity of Material (g/10 min) | | 9 | 12 | 13 | 7 | 4 | 18 | — |
| Curvature Ratio of Peak/Trough | | 2 | 2 | 1 | 2 | 2 | 2 | — |
| Durability (cycle) | Standard (500,000) | 500,000 Passed | 500,000 Passed | 500,000 Passed | 400,000 Damaged | 300,000 Damaged | 100,000 Damaged | 500,000 Passed |
| | Limiting durability | 2,500,000 or more (undamaged) | 1,100,000 Damaged | 800,000 Damaged | Fail to meet standard | Fail to meet standard | Fail to meet standard | 800,000 Damaged |
| | High temperature durability (80° C.) | 500,000 Passed | 500,000 Passed | 500,000 Passed | Fail to meet standard | Fail to meet standard | Fail to meet standard | 100,000 Damaged |

* Material:
1) PBT-PTMEG Block Copolymer: Du Pont, HTR8724 BK320
2) Polyurethane Foam: BASF, MHKG Further, the following Table 2 shows the result of comparing and evaluating physical properties of the material used for manufacturing the bumper stopper integrated with a dust cover in Example 1 and Comparative Example 4.

TABLE 2

| | Item | Example 1 | Comparative Example 4 |
|---|---|---|---|
| Status physical properties | Hardness (Hs) | 43 (shore D) | 59 (shore A) |
| | Tensile strength (kgf/cm²) | 335 | 62 |
| | Elongation (%) | 380 | 450 |

TABLE 2-continued

| Item | | Example 1 | Comparative Example 4 |
|---|---|---|---|
| Aging resistance (70° C. × 336 hours) | Rate of change in tensile strength (%) | +1 | −4 |
| | Rate of change in elongation (%) | 0 | −1 |
| Aging resistance (120° C. × 336 hours) | Rate of change in tensile strength (%) | −1 | −18 |
| | Rate of change in elongation (%) | +21 | −32 |
| Water resistance (80° C. × 240 hours × 95 RH %) | Rate of change in tensile strength (%) | 0 | −4 |
| | Rate of change in elongation (%) | +8 | −1 |
| Oil resistance (Shock absorber oil sedimentation) (70° C. × 288 hours) | Rate of change in tensile strength (%) | 0 | +6 |
| | Rate of change in elongation (%) | +2 | +5 |
| Salt water resistance (100° C. × 336 hours × 25 wt % CaCl$_2$) | Rate of change in tensile strength (%) | +9 | −5 |
| | Rate of change in elongation (%) | −2 | −6 |
| Permanent compression set (%) | | 59 | 10 |
| Low-temperature brittleness (−45° C.) | | No crack | No crack |

Figure 5A:
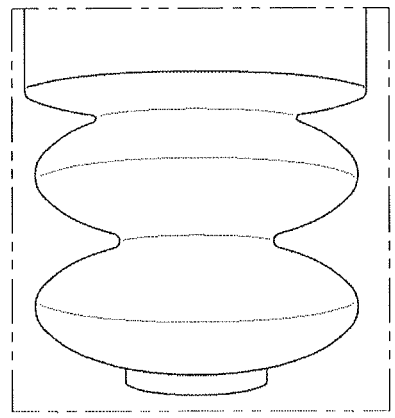
FIG. 5A is a photograph of a bumper stopper integrated with dust cover manufactured using PBT-PTMEG copolymer (example)
Figure 5B:
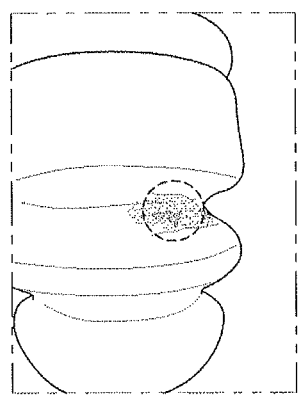
FIG. 5B is a photograph of a bumper stopper integrated with dust cover manufactured using polyurethane (comparative example 4)
Figure 5C:
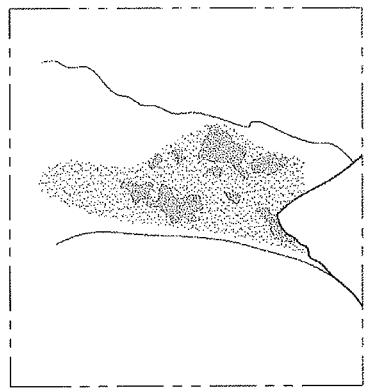
FIG. 5C is a magnified photograph of a damaged portion of a bumper stopper integrated with dust cover manufactured using polyurethane.

FIG. 5A and FIG. 5B illustrates a photograph of the bumper stopper molded products integrated with a dust cover manufactured in Example 1 and Comparative Example 4. It can be confirmed that the bumper stopper (FIG. 5A) manufactured using a PBT-PTMEG block copolymer as a material is excellent in durability performance compared to a bumper stopper (FIG. 5B) formed of urethane foam.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated bumper stopper, comprising:
   a dust cover; and
   a bumper stopper constituting a shock absorber of a vehicle,
   wherein the bumper stopper is formed on an upper portion of the dust cover and continuously extends from the upper portion of the dust cover, and the dust cover and the bumper stopper are integrally molded by using a material comprising a thermoplastic ether ester (TPEE) elastomer, and
   wherein the thermoplastic ether ester elastomer comprises a PBT-PTMEG block copolymer in which 50 to 60 wt % of a unit structure of polybutylene terephthalate (PBT) and 40 to 50 wt % of a unit structure of poly(tetramethylene ether glycol) (PTMEG) are copolymerized.

2. The integrated bumper stopper of claim 1, wherein the bumper stopper is configured to be in a form of a hollow corrugated pipe in which peaks and troughs are repeated in a longitudinal direction of the bumper stopper.

3. The integrated bumper stopper of claim 2, wherein the bumper stopper is of a bellow type having a curvature ratio of peak/trough at 1.8 to 2.2.

4. The integrated bumper stopper of claim 1, wherein the bumper stopper includes a fixing cup on an upper end of the bumper stopper to be fixed and mounted on an upper portion of a piston rod.

5. The integrated bumper stopper of claim 1, wherein the dust cover and the bumper stopper are integrally molded by injection blow molding.

6. The integrated bumper stopper of claim 1, wherein the thermoplastic ether ester elastomer has a melt viscosity of 5 to 20 g/10 min.

7. A shock absorber for a vehicle in which the integrated bumper stopper of claim 1 is mounted.

* * * * *